(12) United States Patent
Batistic

(10) Patent No.: US 8,500,219 B2
(45) Date of Patent: Aug. 6, 2013

(54) METHOD AND DEVICE FOR STABILIZING A VEHICLE

(75) Inventor: Ivica Batistic, Frankfurt (DE)

(73) Assignee: Continental Teves AG & Co. oHG (DE)

( * ) Notice: Subject to any disclaimer, the term of this patent is extended or adjusted under 35 U.S.C. 154(b) by 242 days.

(21) Appl. No.: 12/918,491

(22) PCT Filed: Feb. 13, 2009

(86) PCT No.: PCT/EP2009/051720
§ 371 (c)(1),
(2), (4) Date: Aug. 20, 2010

(87) PCT Pub. No.: WO2009/103665
PCT Pub. Date: Aug. 27, 2009

(65) Prior Publication Data
US 2010/0320833 A1   Dec. 23, 2010

(30) Foreign Application Priority Data
Feb. 22, 2008   (DE) .......................... 10 2008 010 665

(51) Int. Cl.
*B60T 8/1755* (2006.01)

(52) U.S. Cl.
USPC ......................................................... 303/146

(58) Field of Classification Search
USPC ................ 303/139–140, 148–149, 146
See application file for complete search history.

(56) References Cited

U.S. PATENT DOCUMENTS

| | | | |
|---|---|---|---|
| 5,134,352 A | 7/1992 | Matsumoto et al. | |
| 5,328,256 A * | 7/1994 | Ohta et al. | 303/146 |
| 5,774,821 A | 6/1998 | Eckert | |
| 5,826,951 A | 10/1998 | Sano | |
| 6,003,959 A | 12/1999 | Katayose et al. | |
| 6,035,251 A | 3/2000 | Hac et al. | |
| 6,132,014 A * | 10/2000 | Kiso et al. | 303/146 |
| 6,183,052 B1 * | 2/2001 | Harada et al. | 303/147 |
| 6,273,529 B1 | 8/2001 | Woywod et al. | |
| 6,325,469 B1 | 12/2001 | Carson et al. | |
| 6,435,627 B1 | 8/2002 | Roll et al. | |
| 6,438,482 B1 | 8/2002 | Baumann et al. | |
| 6,974,195 B2 | 12/2005 | Batistic et al. | |
| 7,058,492 B1 * | 6/2006 | Yasui et al. | 701/38 |

(Continued)

FOREIGN PATENT DOCUMENTS

| | | |
|---|---|---|
| DE | 41 12 284 A1 | 10/1991 |
| DE | 197 54 898 A1 | 6/1998 |
| DE | 198 17 285 A1 | 4/1999 |
| DE | 198 20 107 A1 | 6/1999 |
| DE | 101 01 197 A1 | 9/2001 |

(Continued)

OTHER PUBLICATIONS

Ding et al., "A New Concept for Yaw Rate Sensor Monitoring", 2005, IFAC.*

*Primary Examiner* — Anna Momper
(74) *Attorney, Agent, or Firm* — RatnerPrestia

(57) ABSTRACT

A method is proposed for stabilizing a vehicle including a braking system that can be actuated by a driver of the vehicle for applying a braking force to at least two vehicle wheels. A braking force corresponding to driver specifications is applied at a first vehicle wheel of an axle, and a braking force that is smaller than the driver specifications is applied to a second vehicle wheel of the axle during a braking actuation by the driver when it is determined that an activation criterion is met. This provides a comfortable stabilization of the vehicle without an active buildup of braking force.

10 Claims, 2 Drawing Sheets

U.S. PATENT DOCUMENTS

| | | | |
|---|---|---|---|
| 7,159,954 B2 * | 1/2007 | Goebels et al. | 303/163 |
| 7,308,353 B2 * | 12/2007 | Villella et al. | 701/70 |
| 7,681,960 B2 * | 3/2010 | Wanke et al. | 303/146 |
| 8,170,746 B2 * | 5/2012 | Gartner | 701/36 |
| 2003/0218378 A1 * | 11/2003 | Tanaka et al. | 303/146 |
| 2004/0046447 A1 * | 3/2004 | Wanke et al. | 303/140 |

FOREIGN PATENT DOCUMENTS

| | | |
|---|---|---|
| DE | 102 23 847 A1 | 1/2003 |
| DE | 195 15 051 B4 | 8/2006 |
| WO | WO 99/58382 | 11/1999 |
| WO | WO 2007113329 A1 * | 10/2007 |

* cited by examiner

METHOD AND DEVICE FOR STABILIZING A VEHICLE

CROSS REFERENCE TO RELATED APPLICATIONS

This application is the U.S. national phase application of PCT International Application No. PCT/EP2009/051720, filed Feb. 13, 2009, which claims priority to German Patent Application No. 10 2008 010 665.8, filed Feb. 22, 2008, the contents of such applications being incorporated by reference herein.

FIELD OF THE INVENTION

The invention relates to a method and a device for stabilizing a vehicle. The device is suitable for carrying out the method in a vehicle. The vehicle can be a motor vehicle.

BACKGROUND OF THE INVENTION

Modern motor vehicles are often equipped with a vehicle dynamics control system, such as the known ESP system (ESP=electronic stability program) which is described, in particular, in DE 195 150 51 A1, which is incorporated by reference. Vehicle dynamics control systems of this type serve to stabilize the vehicle in critical driving situations. For this purpose, the braking force is usually increased in a targeted manner at individual wheels of the vehicle, in order to generate a yaw moment which stabilizes the vehicle. In vehicles having hydraulic brake systems, in order to increase the braking force, a hydraulic unit which is integrated into the brake system is used, which hydraulic unit comprises a pump which makes it possible to build up the brake pressure on an individual-wheel basis independently of a brake actuation of the driver.

The operation of the hydraulic pump is associated with noise and vibrations and can be felt clearly by the driver during an actuation of the brake pedal which is usually provided to operate the brake system. As a rule, the operation of the hydraulic pump is therefore associated with comfort losses for the driver of the vehicle. For this reason, in particular, the control inlet thresholds of the vehicle dynamics control system are typically selected in such a way that interventions are performed only when the vehicle behavior deviates to a relatively great extent from a setpoint behavior.

SUMMARY OF THE INVENTION

It is an object of the present invention to make more comfortable stabilization of a motor vehicle possible.

According to a first aspect of the invention, a method for stabilizing a motor vehicle is proposed which has a brake system which can be actuated by a driver of the vehicle, in order to bring about a braking force at least two vehicle wheels. A build up of a braking force which corresponds to the driver request is permitted at a first vehicle wheel of an axle during a brake actuation of the driver, and a braking force which is reduced in comparison with the driver request is set at a second vehicle wheel of the axle if the satisfying of an activation criterion is determined.

According to a further aspect of the invention, a device is provided for stabilizing a vehicle having a brake system which can be actuated by a driver of the vehicle in order to bring about a braking force at least two vehicle wheels. The device comprises a control device which is configured for controlling an actuator, during a brake actuation of the driver, on account of a determination that at least one activation criterion is satisfied. The actuator is configured to permit a braking force which corresponds to the driver request to be built up at a first vehicle wheel of an axle on account of the control operation, and to set a braking force which is reduced in comparison with the driver request at a second vehicle wheel of the axle.

The invention is based on the vehicle being stabilized by virtue of the fact that a braking force difference is set on one axle. This leads to a yaw moment which acts on the vehicle and counteracts vehicle instabilities. Here, the invention contains the concept of causing the braking force difference by a braking force which is reduced in comparison with the driver request at one vehicle wheel. An increase in the braking force in comparison with the driver request and the associated disadvantages, in particular the comfort losses which are produced, are avoided in this way. The invention can therefore also already be used in the case of relatively small vehicle instabilities.

In one refinement, the axle is a rear axle of the vehicle and the second vehicle wheel is the rear wheel on the inside of the bend. Effective stabilization of the vehicle while driving around a bend can be achieved using a reduced braking force at the rear wheel on the inside of the bend; in particular, oversteer of the vehicle can be counteracted.

In order to reduce the braking force at the second vehicle wheel in comparison with the driver request, one refinement of the method and the device provides for a braking force which is set by the driver at an instant to be maintained. At later instants during the brake operation, the braking force is therefore reduced in comparison with the driver request. The braking force at the first vehicle wheel follows the driver request, with the result that the desired braking force difference is set. One advantage of this refinement comprises the fact that neither an active build up of braking force nor an active decrease of braking force is performed, as a result of which comfort losses are avoided which can be caused by the operation of an actuator which increases the braking force or reduces the braking force.

One embodiment of the method and the device is distinguished by the fact that the brake system of the vehicle comprises wheel brakes which are assigned to the vehicle wheels and can receive pressure medium, in order to generate a braking force, and by the fact that the wheel brake of the second vehicle wheel is shut off, in order to keep the braking force constant. Here, in particular, the brake system can be configured for instance as a hydraulic brake system with liquid pressure medium or as a pneumatic brake system with gaseous pressure medium. In brake systems of this type, the braking force at the second vehicle wheel can be kept constant in a simple way by this wheel brake being shut off, with the result that it receives no more pressure medium.

In some driving situations, the braking force difference which is achieved by the braking force being kept constant at the second vehicle wheel can be too low to stabilize the vehicle. This can be the case, in particular, when the driver does not increase the braking force at the first vehicle wheel in a sufficient way. One development of the method and the device is therefore distinguished by the fact that the braking force at the second vehicle wheel is reduced in comparison with the maintained braking force if it is determined that sufficient stabilization of the vehicle has not been achieved on account of the braking force which is kept constant. A two-stage method is advantageously provided in this development, in which method the braking force at the second vehicle wheel is first of all kept constant and is subsequently reduced if an existing instability cannot be eliminated.

An associated refinement of the method and the device provides for the braking force to be reduced if oversteer of the vehicle is determined while the braking force is kept constant. It can be assumed in this case that sufficient stabilization of the vehicle could not be achieved.

In the case of a high transverse acceleration of the vehicle, in particular, instability of the vehicle which already exists or is imminent can be assumed. One embodiment of the method and the device therefore contains the fact that the satisfying of an activation criterion is determined if a magnitude of a transverse acceleration of the vehicle exceeds a predefined first threshold value.

One associated refinement of the method and the device is distinguished by the fact that the first threshold value is established as a function of a yaw acceleration of the vehicle, a reduction in the first threshold value being carried out, in particular, as the yaw rate increases. As a result, it is taken into consideration that, in particular if a relatively low roadway coefficient of friction exists, instability of the vehicle can already exist, even in the case of relatively low transverse accelerations, if the vehicle has a high yaw acceleration.

One further refinement of the method and the device is distinguished by the fact that the satisfying of an activation criterion is determined if oversteer of the vehicle is established. As has already been mentioned, oversteer is as a rule associated with an unstable driving behavior and therefore leads to the setting of the braking force difference.

Moreover, one development of the method and the device contains the fact that the satisfying of an activation criterion is determined if it is established in a situation that the vehicle behavior changes from understeer to oversteer. A change of this type in the driving behavior of the vehicle is as a rule not anticipated by averagely proficient drivers and regularly leads to a situation where these drivers can no longer control the vehicle. The vehicle is therefore advantageously stabilized in situations of this type by a braking force difference being built up.

One embodiment of the method and the device comprises the fact that the satisfying of an activation criterion is determined if, while or after an understeer vehicle behavior is established, it is established that a filtered value of a deviation between a detected yaw rate and a model-based setpoint yaw rate exceeds an unfiltered value of the deviation by more than one predetermined value. As a result, a change from an understeer vehicle behavior to an oversteer behavior can be determined reliably. The predefined value can be, for example, a predefined percentage deviation. The setpoint yaw rate used describes the setpoint behavior of the vehicle at a predefined speed and a predefined bend radius or a predefined wheel lock angle of the steerable wheels of the vehicle.

The abovementioned and further advantages, special features and expedient developments of the invention also become clear using the exemplary embodiments which will be described in the following text with reference to the figures.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
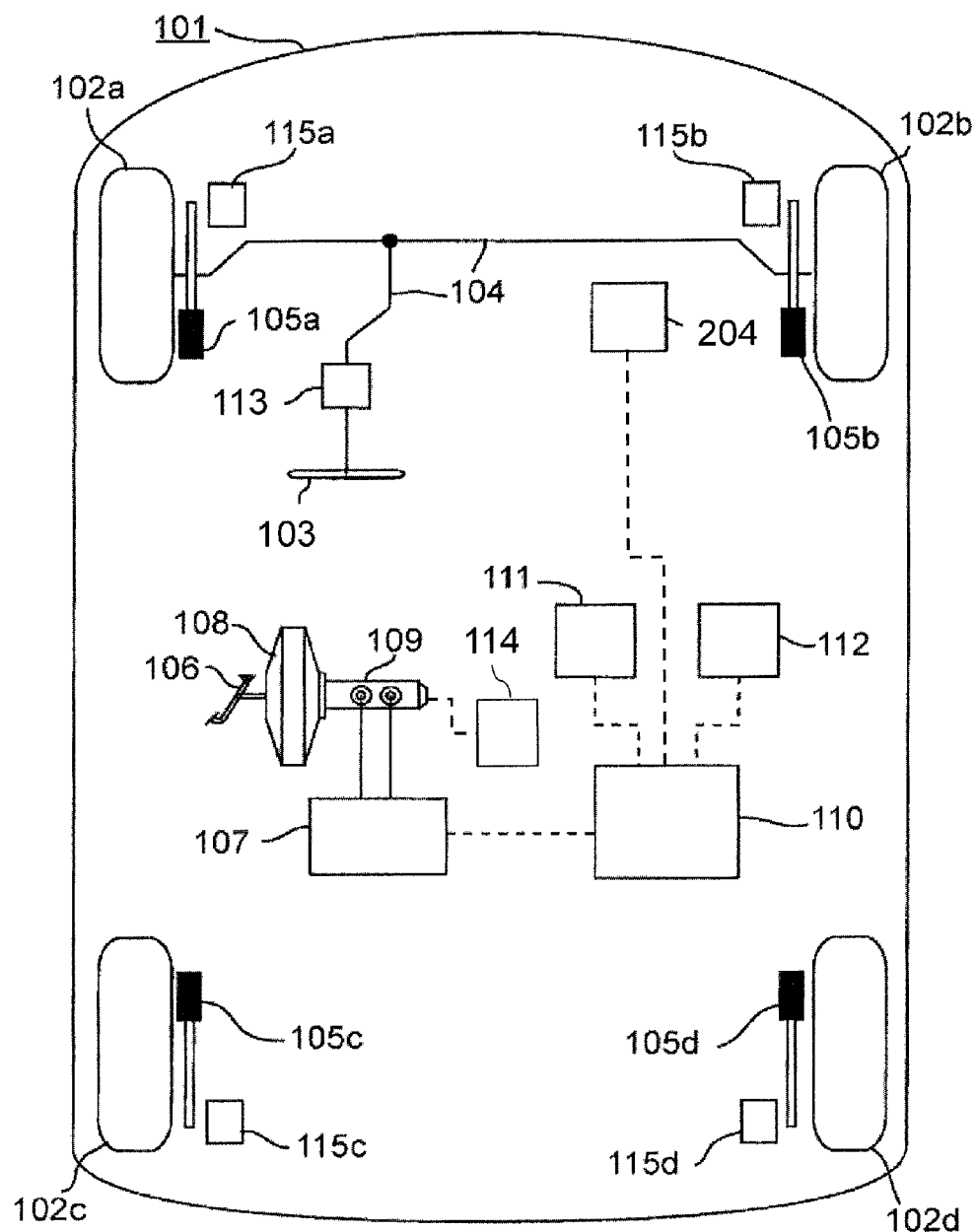
FIG. 1 shows a diagrammatic illustration of a motor vehicle having a system for stabilizing the vehicle in the event of a brake operation while driving around a bend.

FIG. 1 diagrammatically shows a motor vehicle 101 which has two front wheels 102a,b and two rear wheels 102c,d in the exemplary illustration. The front wheels 102a,b are of steerable configuration, and the wheel lock angle can be set by the driver of the motor vehicle 101 by means of a steering handle 103 which is connected to the front wheels 102a,b via a steering line 104. The steering handle 103 is preferably a steering wheel.

The vehicle 101 is driven by a drive motor (not shown in the figure), it being possible for the latter to be, for example, an internal combustion engine, an electric motor or a hybrid motor. The drive motor generates a torque which is transmitted via a drive train (likewise not shown in FIG. 1) to two or four vehicle wheels 102a-d, in order to drive said wheels 102a-d.

A brake system is provided in order to brake the vehicle 101. Said brake system comprises wheel brakes 105a-d which are assigned in each case to one wheel 102a-d. In the case of an actuation of a wheel brake 105a-d, the associated wheel 102a-d is loaded with a braking moment and is braked as a result. In addition, the brake system comprises an actuating device 106 which can be actuated by the driver of the vehicle 101 and is preferably configured as a brake pedal. A braking moment can be set in the wheel brakes 105a-d by the driver with the aid of the actuating device 106, the magnitude of which braking moment results from the extent of the actuation. In addition, an actuator is provided, by way of which the braking moments which are generated by the wheel brakes 105a-d can be changed in comparison with the driver request. Here, in particular, the actuator makes a reduction in the generated braking moments possible in comparison with the driver request. Moreover, there can also be provision for the actuator to be capable of increasing the braking moments in comparison with the driver request and of actuating the wheel brakes 105a-d, if the driver does not actuate the brake system.

This is a hydraulic brake system in the refinement shown. Here, the actuating device 106 is connected to the brake master cylinder 109 via a brake booster 108. A pilot pressure can be built up in the brake master cylinder 109 by means of the actuating device 106 via the brake booster 108, which pilot pressure can be transmitted via pressure lines (not shown in FIG. 1) to the wheel brakes 105a-d. On account of the pressure loading, the wheel brakes 105a-d in each case generate a braking moment, with which the associated wheel 102a-d is braked.

In the refinement shown, the actuator is configured as a hydraulic unit 107 which is connected between the brake master cylinder 109 and the wheel brakes 105a-d. The hydraulic unit 107 can be configured in a manner known per se to a person skilled in the art and can comprise an arrangement of valves and a pressure source which is designed as a pump. The pressure connections between individual wheel brakes 105a-d and the brake master cylinder 109 can be closed by corresponding actuation of the valves. By using the pump and using a corresponding valve control operation, the brake pressure in individual wheel brakes 105a-d can be reduced with respect to a pilot pressure which is set in the brake master cylinder 109 by the driver. Optionally, hydraulic fluid can also be conveyed out of the brake master cylinder 109 into individual wheel brakes 105a-d with the aid of the pump, in order to increase the brake pressure in these wheel brakes 105*a-d* in comparison with the driver request or to generate a braking moment independently of the driver. Hydraulic units 107 of this type are usually also a constituent part of vehicle dynamics control systems which are known per se and have already been used in a multiplicity of vehicles.

The hydraulic unit 107 is connected to a control device 110 which is capable of sending control commands to the hydraulic unit 107, which control commands are implemented by the hydraulic unit 107. The control device 110 is preferably contained in a control unit which comprises a microprocessor for executing programs, the program code of which is stored in the control unit. The control device 110 is preferably configured as a program which is executed in the control unit. Moreover, further programs can be provided in the control unit. One example of this is a vehicle dynamics control system which is known per se, for instance an ESP system. The algorithms which are provided in the programs are as a rule processed in a loop within the control unit, a loop being run through once in one or more cycle steps, in order optionally to generate an output signal. The duration of a loop is predefined and is, for example, between five milliseconds and twenty milliseconds.

The control device 110 receives signals from different sensors of the vehicle 101, which sensors are connected, for example, via a data bus to the control unit. Said sensors are, above all, driving state sensors which comprise a yaw rate sensor 111 for detecting the yaw rate $d\psi/dt$ of the vehicle 101 and a transverse acceleration sensor 112 for detecting the transverse acceleration $a_y$ of the vehicle 101. Moreover, a steering angle sensor 113 is provided for determining the wheel lock angle of the front wheels 102*a,b*, and a further sensor, by way of which a brake actuation by the driver of the vehicle 101 can be determined. This can be, for example, a pressure sensor 114 which detects the pilot pressure which is set by the driver in the brake master cylinder 109. Furthermore, the longitudinal speed of the vehicle 101 is defined, for example using signals from wheel speed sensors 115*a-d* which are arranged in the wheels 102*a-d* of the vehicle 101. The abovementioned sensors are usually also a constituent part of vehicle dynamics control systems. If there is a vehicle dynamics control system, the vehicle 101 therefore does not have to be equipped with additional sensors.

Figure 2:
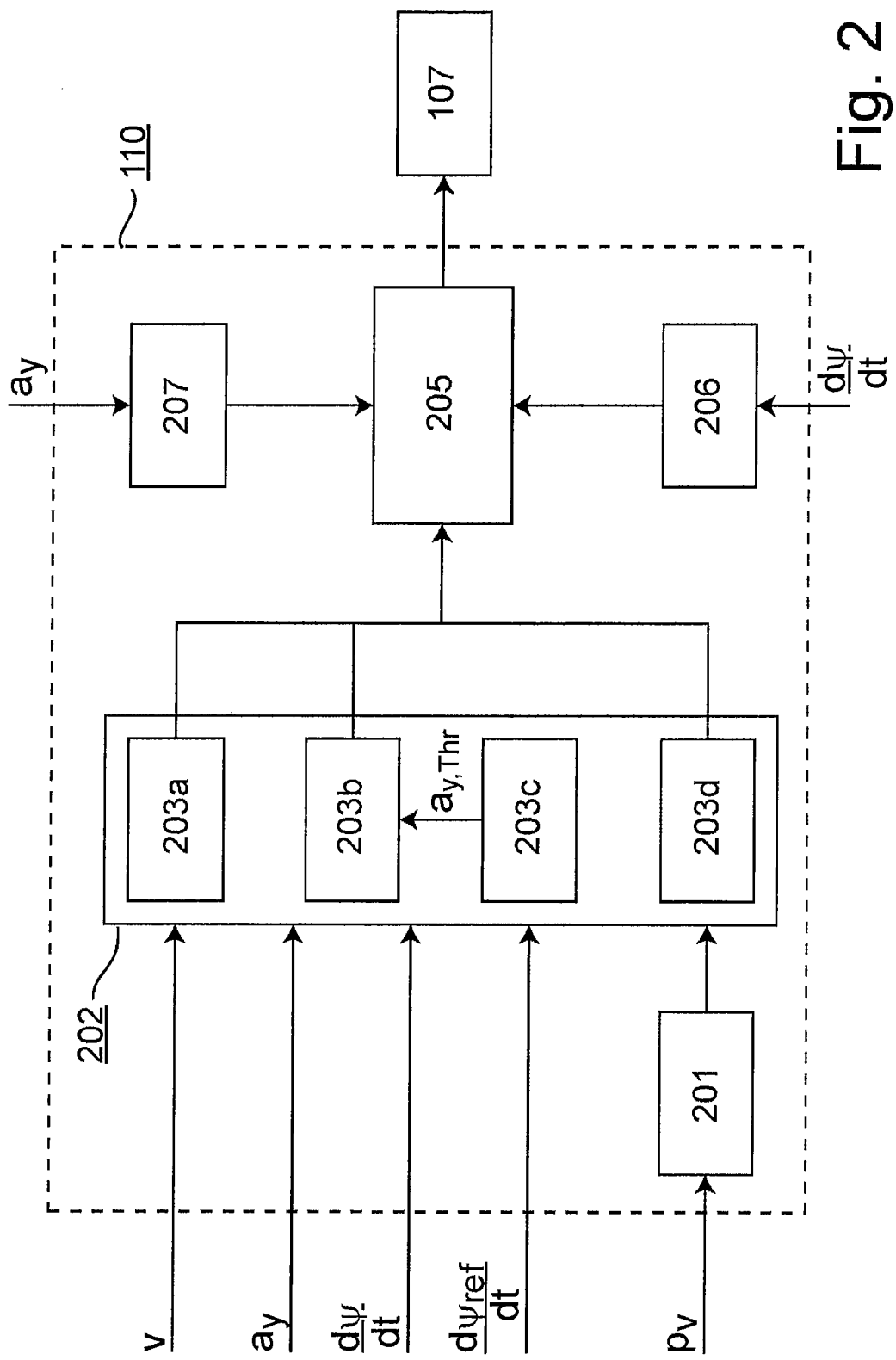
FIG. 2 shows a diagrammatic block illustration of components of the system.

FIG. 2 shows a diagrammatic block illustration of one refinement of the control device 110. The control device 110 performs a control operation of the hydraulic unit 107 during brake operations which are controlled by the driver. The control device 110 is therefore activated in the case of a brake actuation by the driver. Said brake actuation is detected in block 201 using the signals $p_v$ from the pressure sensor 114. In addition, it can be required for the activation of the control device 110 that the pilot pressure $p_v$ exceeds a minimum pressure, which can likewise be checked in block 201.

If the control device 110 is activated, stabilizing interventions in the brake system of the vehicle 101 are performed with the aid of the hydraulic unit 107 if an instability of the vehicle 101 during a retarded drive around a bend is determined. In order to stabilize the vehicle 101, the braking moment at the rear wheel 102*c,d* on the inside of the bend is reduced in comparison with the braking moment at the rear wheel 102*c,d* on the outside of the bend. As a result, oversteer tendencies, in particular, of the vehicle 101 can be counteracted.

In order to set a difference between the braking moments at the rear wheels 102*c,d* on the inside and outside of the bend, a two-stage procedure is preferably selected. In a first stage, the braking moment at the rear wheel 102*c,d* on the inside of the bend is kept constant at an instant, while the braking moment at the rear wheel 102*c,d* on the outside of the bend follows the driver request. This results in a braking moment difference if the driver increases the braking moment after the stated instant. In order to keep the braking moment constant at the rear wheel 102*c,d* on the inside of the bend while the pilot pressure is rising, the connection between the brake master cylinder 109 and the wheel brake 105*c,d* which is assigned to the rear wheel 102*c,d* on the inside of the bend is interrupted in the above-described hydraulic brake system, with the result that the brake pressure in this wheel brake 105*c,d* is kept constant. The operation of the pump which is contained in the hydraulic unit 107, which operation can as a rule be felt clearly by the driver on account of noise development and vibrations, can be dispensed with. Moreover, as a rule only relatively little hydraulic fluid is shut in the locked wheel brake 105*c,d*. As a result of this low volume uptake of the wheel brake 105*c,d*, the brake system can be operated as a rule by the driver in the normal way; in particular, the driver as a rule does not feel a changed pedal sensation. The brake intervention therefore cannot be discerned or can scarcely be discerned by the driver, and the driving comfort is not impaired.

If the vehicle 101 cannot be stabilized sufficiently by the above-described intervention in the first stage, the braking moment at the rear wheel 102*c,d* on the inside of the bend is reduced in the second stage. The braking moment difference is increased by this, as a result of which the stabilizing torque which acts on the vehicle 101 is increased on account of the braking moment difference. The reduction in the braking moment at the rear wheel 102*c,d* on the inside of the bend can be repeated successively, until stabilization of the vehicle 101 is achieved or a maximum braking moment difference has been set. In the above-described hydraulic brake system, the brake pressure is reduced in the wheel brake 105*c,d* which is assigned to the rear wheel 102*c,d* on the inside of the bend, in order to reduce the braking moment which is generated by this wheel brake 105*c,d*. Here, a reduction in the brake pressure is caused by the fact that, in the case of a suitable valve position, hydraulic fluid is pumped out of the wheel brake 105*c,d* with the aid of the pump, counter to the pilot pressure which is set by the driver. On account of operation of the pump which is contained in the hydraulic unit 107, comfort losses for the driver cannot be avoided completely in the second stage.

Instabilities of the vehicle 101 which occur during retarded driving around bends are detected using activation criteria which are monitored in an activation device 202 of the control device 110. To this end, in one refinement, the activation device 202 comprises four modules which are shown in FIG. 2 as blocks 203*a-d* and in each case monitor one activation criterion. A brake intervention is preferably performed when an unstable driving situation has been detected using at least one activation criterion. In this case, an activation signal is sent by the corresponding block 203*a-d* to the actuator controller 205 of the control device 110 which thereupon performs a corresponding actuation of the hydraulic unit 107.

Input signals of the activation device 202 are the yaw rate $d\psi/dt$ which is measured by means of the yaw rate sensor 111 and the transverse acceleration $a_y$ of the vehicle 101 which is measured by means of the transverse acceleration sensor 112. A further input signal is the reference yaw rate $d\psi_{ref}/dt$. This is calculated in the calculating unit 204 using the wheel lock angle which is set by the driver at the front wheels 102*a,b* and using the vehicle speed and optionally further variables with the use of a vehicle model, and corresponds to the setpoint yaw rate of the vehicle 101. In the refinement shown, the reference yaw rate is calculated outside the control device 110. As long as the vehicle 101 has a vehicle dynamics control system, there can be provision, for instance, for the reference yaw rate to be calculated in this system and to be made available to the control device 110 by this system. However, a calculation operation can also likewise be provided in the control unit 110.

In block 203a, an activation signal is preferably generated if oversteer of the vehicle 101 has been determined. To this end, in one refinement, the magnitude of the measured yaw rate $d\psi/dt$ is compared with the magnitude of the reference yaw rate $d\psi_{ref}/dt$. Oversteer is determined if the difference $|d\psi/dt|-|d\psi_{ref}/dt|$ between the magnitude of the yaw rate $d\psi/dt$ and the magnitude of the reference yaw rate $d\psi_{ref}/dt$ exceeds a threshold value. This lies, for example, between 1 degree per second and 5 degrees per second, preferably at 2 degrees per second.

In block 203b, a check is made as to whether the magnitude of the detected transverse acceleration $a_y$ exceeds a predefined threshold value $a_{y,Thr}$. If this is the case, an activation signal is sent to the actuator controller 205 by block 203b. This activation criterion is used to detect retarded driving around bends on a roadway with a high roadway coefficient of friction, in which the vehicle 101 is exposed to high transverse accelerations $a_y$. The threshold value $a_{y,Thr}$ is provided by block 203c.

Block 203c is designed for detecting highly dynamic driving situations, in which vehicle instabilities can occur. This takes place in block 203c by an evaluation of the yaw acceleration of the vehicle 101. The yaw acceleration can be defined from the vehicle yaw rate $d\psi/dt$ which is measured by means of the yaw rate sensor 111. In the system which is shown by way of example in FIG. 2, the temporal derivation of the yaw rate $d\psi/dt$ is established in block 203c within the activation device 202. However, there can likewise be provision for the yaw acceleration to be calculated at another point from the yaw rate $d\psi/dt$ and the result is transmitted to the activation device 202, in particular to block 203c. Moreover, there can be provision in an alternative refinement for a measurement by means of a corresponding rotary acceleration sensor to be performed instead of the calculation of the yaw acceleration, and for the measured signals of this sensor to be made available to block 203c of the activation device 202.

In block 203c, the magnitude of the yaw acceleration is compared with a threshold value. Here, this can be a fixedly predefined threshold value. However, a speed-dependent threshold value is preferably used as the basis, which threshold value becomes smaller as the speed of the vehicle 101 increases. This takes into consideration the fact that high yaw accelerations at relatively high vehicle speeds lead with relatively high probability to vehicle instabilities.

If the yaw acceleration lies below the threshold value in terms of magnitude, a basic threshold value is used as the basis for the transverse acceleration in block 203b, which basic threshold value is reported by block 203c to block 203b. In one refinement, the basic threshold value lies between 0.6 g and 1.2 g, preferably at 0.8 g (g=gravitational acceleration). If the yaw acceleration exceeds the threshold value in terms of magnitude, a reduced transverse acceleration threshold is defined in block 203c, which reduced transverse acceleration threshold is used in block 203b for the comparison between the transverse acceleration and the threshold value. The reduced threshold is defined starting from the basic threshold value. Said basic threshold value is reduced by an amount which is determined as a function of the yaw acceleration. To this end, a corresponding rule which is stored in the control device 110 is used to define the amount.

The reduction in the transverse acceleration threshold, which reduction is dependent on the yaw acceleration, takes the fact into consideration that a drop in the transverse acceleration in the case of a high yaw acceleration is as a rule not a sign of a stabilization of the vehicle 101. Thus, for example, the transverse acceleration can also drop in the case of a high yaw acceleration if the roadway coefficient of friction is reduced. In driving situations of this type, stabilization of the vehicle 101 is therefore ensured.

Block 203d serves to detect driving situations, in which the vehicle behavior changes from an understeer behavior to an oversteer behavior. Situations of this type which can occur, in particular, in the case of low roadway coefficients of friction, such as in the case of wetness, regularly make high requirements of the driver of the vehicle 101. The vehicle 101 often cannot be controlled in situations of this type by averagely proficient drivers. If a vehicle behavior of this type has been determined in block 203d, an activation signal is sent to the actuator controller 205.

In order to detect driving situations of the above-described type, the difference between the yaw rate $d\psi/dt$ of the vehicle 101 which is measured by means of the yaw rate sensor 111 and the calculated reference yaw rate $d\psi_{ref}/dt$ is evaluated in block 203d. This difference is the control deviation which is usually based on a vehicle dynamics control operation and is compensated for by the latter. In one refinement, the yaw rate difference is first of all used in block 203d to establish an understeer behavior of the vehicle 101. A driving behavior of this type is determined if the magnitude of the yaw rate $d\psi/dt$ of the vehicle 101 is smaller by a predefined amount than the reference yaw rate $d\psi_{ref}/dt$. As an alternative, an understeer driving behavior can also be established in another way which is known to a person skilled in the art.

If an understeer driving behavior of the vehicle 101 has been determined, block 203d monitors whether a change to an oversteer driving behavior changes. To this end, the yaw rate difference signal is filtered by a low pass filter. The filtered signal is then compared with the unfiltered yaw rate difference. An activation signal is generated in block 203d and is sent to the actuator controller 205 if the magnitude of the unfiltered yaw rate difference is smaller by a predefined percentage than the magnitude of the filtered yaw rate difference. It is to be assumed in this case that the driving behavior of the vehicle 101 approximates to an oversteer behavior. The percentage lies, for example, between 20% and 40%, preferably at 30%.

For the low pass filter, a time constant is preferably selected between 250 ms and 400 ms, approximately a time constant of approximately 350 ms. The time constant therefore lies in the order of magnitude of the time constants of a typical vehicle 101, with the result that the driving behavior can be replicated by means of the low pass filter. In one refinement, the low pass filter is configured as a first order delay element (P-$T_1$ element).

After the actuator controller 205 has received an activation signal from one of blocks 203a-d, it controls the hydraulic unit 107 in such a way that the braking force at the rear wheel 102c,d on the inside of the bend is kept constant and cannot be increased further by the driver. This takes place by the control operation of the valves of the hydraulic unit 107 which has already been described. The rear wheel 102c,d on the inside of the bend is determined by the actuator controller 205 using a measured signal which is sensitive to the bend direction. This can be the wheel lock angle of the front wheels 102a,b, the transverse acceleration $a_y$ of the vehicle 101 or the yaw rate dψ/dt of the vehicle 101. A plurality of the abovementioned variables can likewise be used to determine the bend direction.

While the braking force at the rear wheel 102c,d on the inside of the bend is kept constant with the aid of the hydraulic unit 107, a test is carried out in the control device 110 as to whether the vehicle 101 is stabilized on account of the intervention performed or whether sufficient stabilization of the driving behavior of the vehicle 101 does not take place. The latter is preferably determined if an oversteer driving behavior of the vehicle 101 is determined despite the intervention. This takes place by way of an evaluation of the activation signal which is generated in block 203a and is generated, as described previously, as a function of the comparison between the measured yaw rate dψ/dt of the vehicle 101 and the reference yaw rate $d\psi_{ref}/dt$.

If the activation signal which is generated in block 203a is present in the actuator controller 205, that is to say if there is an oversteer driving behavior despite the intervention which is controlled by the actuator controller 205, the actuator controller 205 controls the hydraulic unit 107 in such a way that the braking force at the rear wheel 102c,d on the inside of the bend is reduced. To this end, the valves and the pump of the hydraulic unit 107 are actuated in a suitable manner, as has already been described.

The amount is preferably predefined fixedly, by which the braking force at the rear wheel 102c,d on the inside of the bend is reduced in one step or by which the brake pressure is reduced. For example, there can be provision in the hydraulic brake system for the brake pressure in the wheel brake 105c,d to be reduced in one step by an amount between 3 bar and 7 bar, preferably by an amount of 5 bar. Furthermore, a maximum duration for the pressure drop is preferably predefined. The hydraulic unit 107 or the pump contained in it can therefore be switched off after the predefined time duration if a pressure reduction by the predefined amount cannot be performed on account of an excessively low brake pressure in the relevant wheel brake 105c,d. In one refinement, the time duration lies between 200 ms and 300 ms, preferably at 250 ms.

As long as, after the first reduction in the braking force, an activation signal continues to be received or is received again by block 203b, that is to say if an oversteer driving behavior continues to be determined or is determined again, a further reduction in the braking force at the rear wheel 102c,d on the inside of the bend takes place in a further step. Here, the braking force is reduced in the same way as in the preceding step. Further steps can follow subsequently, in which the braking force at this vehicle wheel 102c,d is reduced further.

A reduction in the pressure difference takes place as the yaw rate dψ/dt of the vehicle 101 decreases. In order to determine a decreasing yaw rate, the latter is monitored in block 206. In one refinement, a decrease in the yaw rate is determined in block 206 when the sign of the yaw rate dψ/dt differs from the sign of the yaw acceleration. This allows a very reliable determination of a decreasing yaw rate. However, there can likewise also be provision, for example, for the magnitude of the yaw rate value which is established in the current loop to be compared with the magnitude of the yaw rate value which is established in the preceding loop. If a decreasing yaw rate dψ/dt has been established in block 206, this is reported to the actuator controller 205.

Moreover, the control device 110 contains a block 207 which checks whether a control exit criterion is satisfied. This is the case in one refinement if the transverse acceleration $a_y$ of the vehicle 101 is lower than a predefined exit threshold value or than the transverse acceleration maximum reduced by a predefined amount. In one refinement, the exit threshold value lies between 0 and 0.3 g, preferably at 0.1 g. The transverse acceleration maximum is the maximum magnitude of the transverse acceleration in the current driving maneuver, that is to say since the entry into the control operation. The transverse acceleration maximum is established in block 206 by continuous monitoring of the vehicle transverse acceleration $a_y$. The transverse acceleration threshold which is based on the transverse acceleration maximum and is decisive for a control exit corresponds in one refinement to the transverse acceleration maximum reduced by 0.2 g. If it has been determined in block 207 that the control exit condition is met, this is reported to the actuator controller 205.

If the control exit condition is not met, but a decreasing yaw rate dψ/dt is reported by block 206, the braking force difference at the rear wheels 102c,d of the vehicle 101 is reduced by the actuator controller 205. To this end, the actuator controller 205 controls the hydraulic unit 107 in such a way that the braking force at the rear wheel 102c,d on the inside of the bend is increased. Here, in a first step, a braking force increase is carried out by a predefined amount which is lower than the braking force difference. In order to increase the braking force at the rear wheel 102c,d on the inside of the bend in the hydraulic brake system described, the brake pressure in the wheel brake 105c,d of the rear wheel 102c,d on the inside of the bend is increased by the disconnected connection to the brake master cylinder 109 being opened. An active build up of brake pressure by means of the pump which is contained in the hydraulic unit 107 is not required, since the amount, by which the brake pressure is increased, is lower than the brake pressure difference at the rear wheels 102c,d.

If a decreasing yaw rate dψ/dt is reported by block 206 and block 207 reports that the control exit condition is met, the actuator controller 205 controls the hydraulic unit in such a way that the braking forces at the rear wheels 102c,d are matched with one another. This likewise takes place by a braking force increase being permitted at the rear wheel 102c,d on the inside of the bend. In the hydraulic brake system, to this end once again the previously disconnected connection of the corresponding wheel brake 105c,d to the brake master cylinder 109 is opened.

As long as stabilization of the vehicle 101 cannot be achieved by the interventions in the brake system of the vehicle 101, which interventions are controlled by means of the actuator controller 205, the deviation between the setpoint behavior of the vehicle 101 and its actual behavior is increased. If this deviation has reached a defined magnitude, control interventions of the vehicle dynamics control system of the vehicle 101 take place, if said system is present. In interaction with a vehicle dynamics control system of this type, the interventions which are performed by means of the control device 110 are carried out before the control interventions of the vehicle dynamics control system. In many cases, as a result, control interventions of the vehicle dynamics control system which are associated with comfort losses for the driver, as explained in the preceding text, can be avoided, since the vehicle 101 can be stabilized before the control entry thresholds of the vehicle dynamics control system are reached.

Although the invention has been described in detail in the preceding summary and the drawings, the summaries are to be understood to be illustrative and/or exemplary and not restrictive; in particular, the invention is not restricted to the exemplary embodiments which are described. Furthermore, it is considered according to the invention to use the method on at least one axle, the front axle and/or rear axle, and/or on both axles.

Further variants of the invention and their execution result for a person skilled in the art from the preceding disclosure, the figures and the patent claims.

Expression used in the patent claims such as "comprise", "have", "contain" and the like do not rule out further elements or steps. The use of an indefinite article does not rule out a plural. A single device can carry out the functions of a plurality of devices or units mentioned in the patent claims.

The invention claimed is:

1. A method for stabilizing a vehicle having a brake system which is configured to be actuated by a driver of the vehicle in order to bring about a braking force, said method comprising the steps of:
    applying a first braking force on each wheel of the vehicle during a brake actuation of the driver, the first braking force no greater than a braking force corresponding to a driver request; and
    setting a second braking force on at least one wheel of the vehicle upon satisfying an activation criterion while maintaining the first braking force on the remaining wheels of the vehicle, the second braking force less than the braking force corresponding to the driver request,
    wherein the satisfying of the activation criterion is determined if a magnitude of a transverse acceleration of the vehicle exceeds a predefined first threshold value, and
    wherein the first threshold value is established as a function of a yaw acceleration of the vehicle, and a reduction in the first threshold value is carried out as a magnitude of a yaw acceleration of the vehicle increases.

2. The method as claimed in claim 1, wherein the at least one wheel of the vehicle is a rear wheel on an inside of a bend in a road.

3. The method as claimed in claim 1, the brake system comprising wheel brakes which are assigned to the vehicle wheels and are configured to receive pressure medium, in order to generate the first and second braking forces, and the wheel brake of the at least one wheel of the vehicle being shut off, in order to keep the second braking force constant.

4. The method as claimed in claim 1, further comprising determining if a predetermined level of stabilization of the vehicle has been achieved,
    wherein the second braking force is set if it is determined that a predetermined level of stabilization of the vehicle has not been achieved on account of the first braking force.

5. The method as claimed in claim 4, further comprising determining if oversteer of the vehicle is occurring,
    wherein the second braking force is set if oversteer of the vehicle is determined to be occurring while the first braking force is kept constant.

6. The method as claimed in claim 1, in which the reduction in the first threshold value is carried out when a magnitude of the yaw acceleration of the vehicle exceeds a second threshold value.

7. The method as claimed in claim 1, in which the satisfying of an activation criterion is determined if oversteer of the vehicle is established.

8. The method as claimed in claim 1, in which the satisfying of an activation criterion is determined if it is established that a vehicle behavior changes from understeer to oversteer.

9. The method as claimed in claim 1, in which the satisfying of an activation criterion is determined if, during or after an understeer vehicle behavior is established, it is also established that a filtered value of a deviation between a detected yaw rate and a model based setpoint yaw rate exceeds an unfiltered value of the deviation by more than one predetermined value.

10. A device for stabilizing a vehicle having a brake system which is configured to be actuated by a driver of the vehicle in order to bring about a braking force, comprising:
    a control device which is configured for controlling an actuator, during a brake actuation of the driver, on account of a determination that at least one activation criterion is satisfied,
    said actuator being configured (i) to permit a first braking force to be applied on each wheel of the vehicle during the brake actuation of the driver, the first braking force no greater than a braking force corresponding to a driver request, and (ii) to set a second braking force on at least one wheel of the vehicle upon satisfying the activation criterion while maintaining the first braking force on the remaining wheels of the vehicle, the second braking force less than the braking force corresponding to the driver request,
    wherein the satisfying of the activation criterion is determined if a magnitude of a transverse acceleration of the vehicle exceeds a predefined first threshold value, and
    wherein the first threshold value is established as a function of a yaw acceleration of the vehicle, and a reduction in the first threshold value is carried out as a magnitude of a yaw acceleration of the vehicle increases.

* * * * *